United States Patent [19]

Mitts

[11] Patent Number: 5,249,900

[45] Date of Patent: Oct. 5, 1993

[54] THREADED FASTENER FOR MOUNTING WITHIN AN OPENING IN A PANEL

[75] Inventor: Richard K. Mitts, Fullerton, Calif.

[73] Assignee: California Industrial Products, Inc., Santa Fe Springs, Calif.

[21] Appl. No.: 946,650

[22] Filed: Sep. 18, 1992

[51] Int. Cl.$^5$ .................... F16B 19/00; F16B 37/04
[52] U.S. Cl. ................................ 411/182; 411/508; 411/913
[58] Field of Search ........ 411/111, 112, 182, 508–510, 411/913, 917

[56] References Cited

U.S. PATENT DOCUMENTS

| | | | |
|---|---|---|---|
| 3,375,749 | 4/1968 | Coldren et al. | 411/913 X |
| 3,400,743 | 9/1968 | Strange | 411/913 X |
| 3,605,846 | 9/1971 | Van Niel et al. | 411/112 |
| 3,701,373 | 10/1972 | Wronke et al. | 411/182 |
| 5,106,225 | 4/1992 | Andre et al. | 411/182 X |

*Primary Examiner*—Neill R. Wilson
*Attorney, Agent, or Firm*—George J. Netter

[57] ABSTRACT

A light-weight sheet metal fastener (10) is formed from a single flat metal blank (20) to include first and second pairs of opposite side wall members (22, 24) having parts formed into leaf spring members (49), all surrounding a threaded sleeve (16) unitary with a center plate (12). The side wall members (22, 24) extend through a panel (14) opening (60) during mounting and the spring members lock against fastener removal.

5 Claims, 2 Drawing Sheets

THREADED FASTENER FOR MOUNTING WITHIN AN OPENING IN A PANEL

BACKGROUND

1. Field of the Invention

The present invention relates generally to an internally threaded sheet metal fastener and, more particularly, to such a threaded fastener which is automatically locked within a receiving opening in a panel.

2. Description of Related Art

There exists a need for sheet metal internally threaded fasteners which can be snapped within a hole or opening in a relatively thin panel and provide a light weight fastening relationship with both the panel and a screw threaded therein. For example, there are many situations in which it is desired to provide a fastener mounted to a panel in which it would either be expensive, highly inconvenient, or practically impossible to be able to have direct access to both sides of the panel. In an automobile, for example, there are many panels that are placed in position during manufacture and assembly of the vehicle to which it is also necessary later in assembly to attach other items, and this is typically accomplished by providing a snap-on or other nut means which can be applied within an opening and from the outside of the panel alone.

It is also desirable that such a fastener be readily applied through a panel access opening from one side as already mentioned, and that the fastener once in place is strongly retained within the panel opening. Such a fastener should also desirably have a multithread for receiving a screw therein to aid in mounting items thereto.

SUMMARY OF THE INVENTION

There is provided in accordance with the present invention a relatively light-weight sheet metal fastener formed from a single flat blank into a final configuration that enables being snapped into place within an opening (e.g., square) in a panel from one side of the panel, and, upon being so positioned therein, is satisfactorily and reliably retained. Also, parts of the fastener are threaded for receiving an appropriately dimensioned and threaded screw, for example.

The fastener includes a first pair of opposite side walls which are so dimensioned as to provide a resiliently loose fit within the panel opening throughout full manufacturing tolerance ranges. The second pair of opposite side walls have spring members compressed while the fastener is being inserted within the panel opening and which extend outwardly to lock against the panel back side when the fastener is fully seated.

DESCRIPTION OF A PREFERRED EMBODIMENT

Figure 1:
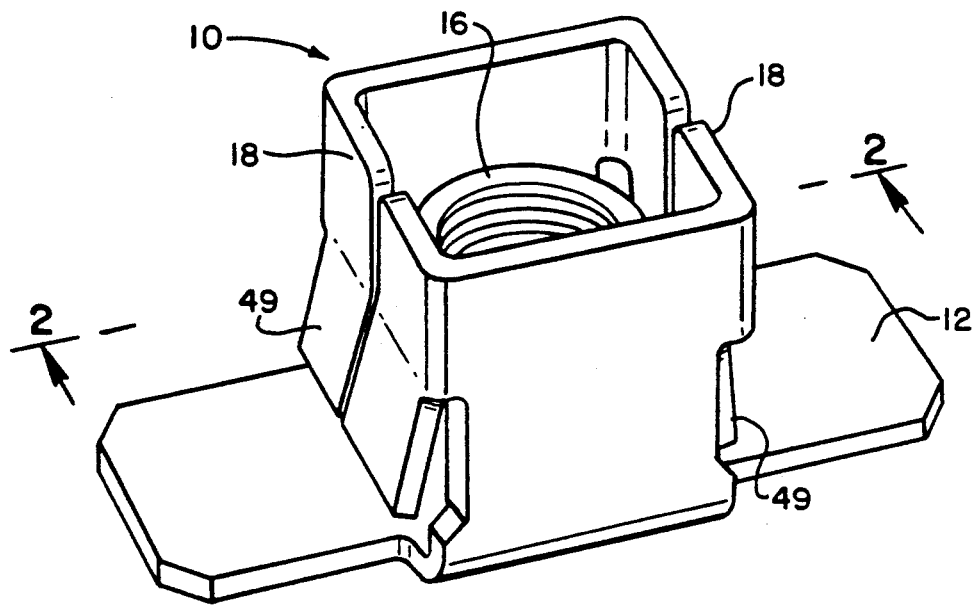
FIG. 1 is a perspective view of the sheet metal fastener of this invention.

With reference now to the drawings, and particularly FIG. 1, the sheet metal fastener of the present invention is enumerated generally as 10. In its major parts, the fastener includes a pressure plate 12 for positioning against a major surface of a panel 14 (FIG. 3) to which the fastener is mounted, a threaded sleeve 16 for receiving a threaded screw (not shown) in conventional manner, and upstanding locking and securing walls 18 surrounding the threaded sleeve via which the fastener is firmly and lockingly secured to the panel in a way that will be more particularly described. Also, as will be set forth in detail, the fastener is formed from a single sheet metal blank 20 initially cut to a predetermined configuration.

Figure 8:
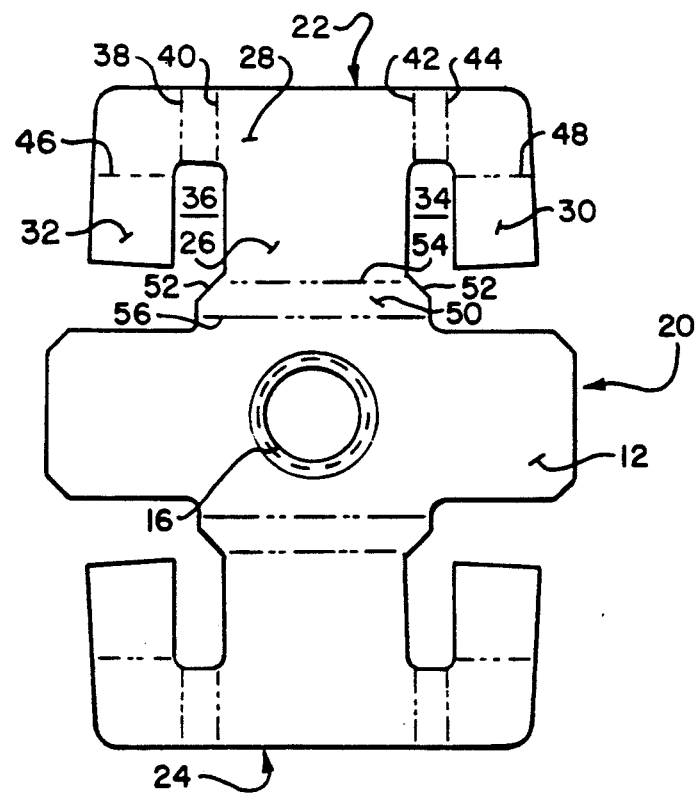
FIG. 8 is a plan view of the blank from which the fastener of this invention is formed.

Turning to FIG. 8, sheet metal blank 20 from which the fastener 10 of the present invention is to be formed includes in the central part the pressure plate 12 which is a generally rectangular element having its four corners removed and further including integrally and unitarily therewith first and second identical side wall members enumerated generally as 22 and 24. Since these two latter members are identical, only the side wall member 22 will be described in detail.

Specifically, the side wall member 22 is generally T-shape with a center plate 26 of rectangular construction with an end joining the pressure plate 12 at the center of the long dimension thereof. The crossbar 28 of the member 22 extends outwardly from both lateral edges of the center plate and has end portions 30 and 32 that turn back towards the pressure plate a predetermined amount and having spaces 34 and 36 between the turned back end portions and the center plate.

Figure 2:
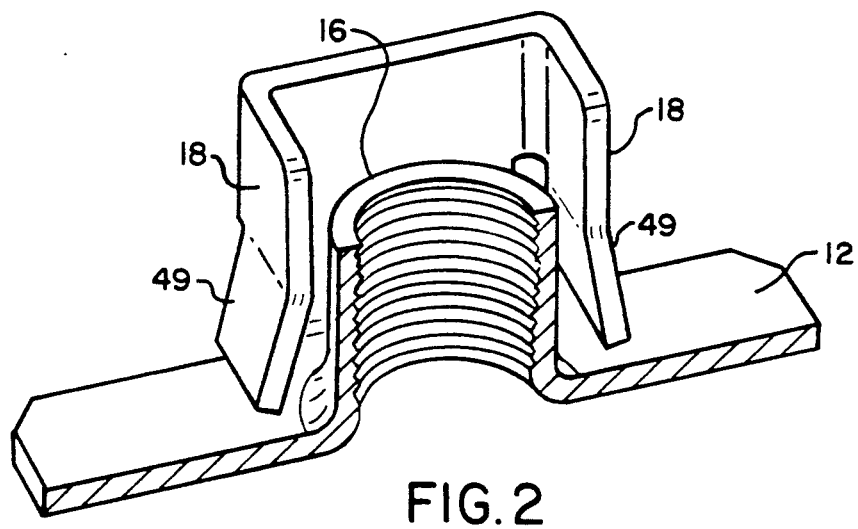
FIG. 2 is an elevational, sectional view taken along the line 2—2 of FIG. 1.

Spaced apart dash lines 38, 40 and 42, 44 extend at right angles to the axis of the cross bar 28 to define a pair of regions in which the turned back end portions are to be bent with respect to the center post as will be described. Also, fold lines 46 and 48 extend completely across each of the turned back end portions generally parallel to the central axis of the pressure plate 12 and identify lines at which the end portions are to be flared outwardly slightly to form leaf spring members 49 (FIG. 2) for a purpose to be described.

Integrally joining the center plate 26 to the pressure plate 12 is a strip of material 50 extending equally outwardly of both edges of the center plate a slight amount and having angled ends 52, the latter providing smooth opening acceptance during assembly. First and second fold lines 54 and 56 spaced apart from one another and parallel to the central axis of the pressure plate define a fold or bend line region for the center plate with respect to the pressure plate.

Preferably the blank 20 is stamped from a metal sheet (e.g., steel). Also, it is important to note that where any two edges of the blank meet to form an internal corner that they are radiused to avoid weakening of the structural integrity of the item which could result if these corners were formed at a sharp angle.

A first step in the formation of the fastener 10 from the blank 20 is to produce the sleeve 16 having a plurality of internal threads. Preferably, this sleeve is provided from the flat sheet metal by the use of a set of progressive dies which successively apply pressure to the flat metal sheet to form an extended sleeve and then pass the sheet with extended sleeve through a threading station for achieving the desired threading. The sleeve 16 is located at substantially the center of the pressure plate 12.

Figure 4:
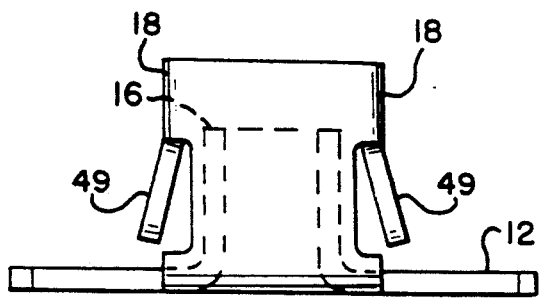
FIG. 4 is a side view.
Figure 5:
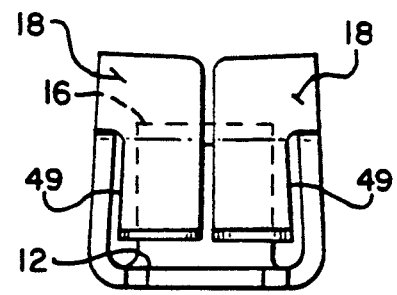
FIG. 5 is an end view of the nut.

Next, the sheet turned back end portions 30 and 32 are formed down (FIG. 8) or outwardly as seen in FIG. 4 following which the sheet is formed at 90 degrees in the bend regions defined by the paired lines 38, 40 and 42, 44. Lastly, the side wall member 22 is formed at 90 degrees along bend region 54, 56 to plate 12. Side wall member 24 is similarly formed.

Figure 6:
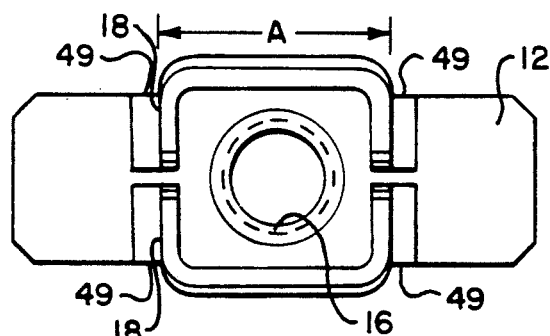
FIGS. 6 and 7 are bottom and top plan views.
Figure 7:
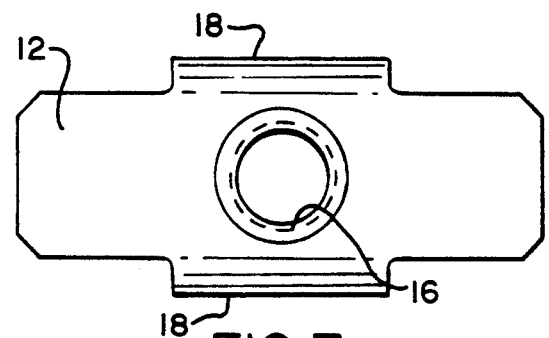

As shown in FIG. 6, which is a top plan view as seen from the open end of the threaded sleeve, the locking and securing walls 18 are rectangular and, more particularly, are square. However, it is to be understood that other geometric shapes may be found advantageous for the walls 18 and spring means, such as hexagonal, for example. The side dimensions of these walls identified as A are only slightly less than the side dimensions identified as 58 in FIG. 3 of the square opening 60 in the panel 14 within which the fastener is to be mounted.

Figure 3:
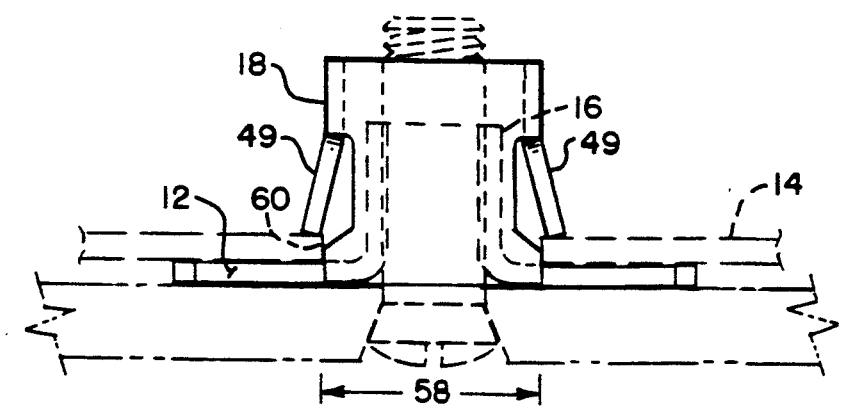
FIG. 3 is a side view showing the fastener of this invention mounted onto a panel.

To assemble the fastener onto the panel 14, the forward edge walls of the locking and securing walls 18 are inserted within the opening 60 until the pressure plate major surface is in intimate contact with the panel major surface. At this time, the outwardly flaring end portions of portions 30 and 32 have been squeezed together, or toward one another, until the lower edges pass completely through the opening and, then, by the inherent resiliency of the material snap outwardly to lock against the back side of the panel (FIG. 3). The opposite two sides of the locking and securing wall 18 taper toward one another as you move away from the pressure plate interconnection point. Accordingly, when the fastener is fully received within the opening 60 in the panel 14, all four sides of the locking and securing walls 18 are slightly spaced from the opening side walls. Also, as can be seen best in FIGS. 3 and 4, the extended spring-like arms formed by the flared out end portions 30 and 32 lock against the panel underside adjacent the panel opening and prevent withdrawal of the fastener from the panel. The combined effect of these two securing actions is to provide a reliable and light weight fastener for mounting to a panel.

The preferred manner of mounting a part 61 to the panel by use of the described fastener includes passing the threaded end of a screw (or bolt) 62 through an opening in the part and then thread into the fastener sleeve 16 as shown in FIG. 3. The screw head 64 on tightening applies a load to the sleeve and part which causes the spring members 49 to move transversely outward clamping the panel more securely.

In practical constructions of the described fastener, the blank material was SAE 1050 steel of a thickness varying from 0.024 to 0.041 inches (0.61 to 1.04 mm) where the fastener dimension A varied from 0.362 to 0.657 inches (9.2 to 16.7 mm). This fastener has the desirable feature of breaking a bolt or screw if cross threading occurs, for example.

The fastener described herein has a mode of failure which is not known to occur in any existing snap-in fastener. A conventional "crippling" fastener is forced to yield, upset, or otherwise be distorted, usually by a tool or other assembly means in order to effect retention onto a panel, and the distorted part of the fastener typically carries the full clamp load. The described fastener, on the other hand, has the clamp load exerted by the end edges of the spring members 30 and 32 onto the panel, and increase of the load causes the end edges of the spring members to move away from the panel opening 60 which produces an increase in fastener resistance to removal from the panel opening.

Although the present invention has been described in connection with a preferred embodiment, it is to be understood that those skilled in the art may provide modifications that come within the spirit of the invention as described and within the ambit of the appended claims.

What is claimed is:

1. A fastener formed from a single flat metal sheet for receipt within an opening in a panel, comprising:
   a centrally located generally rectangular pressure plate for being positioned against the panel;
   internally threaded hollow sleeve means integral with the pressure plate and extending away from a major surface of said pressure plate;
   first and second generally T-shaped side wall members consisting of a center plate and unitary cross bar, each side wall member having an end of its center plate integrally attached with the pressure plate at respective opposite sides of the pressure plate; and
   portions of each cross bar forming spring members for clampingly engaging the panel adjacent the panel opening when the side wall members and hollow sleeve are received within the opening.

2. A fastener as in claim 1, in which the outer end portions of each cross bar extends toward the center plate with an outer end portion of one cross bar being bent to lie in the same plane with an outer end portion of the other cross bar collectively forming a spring member.

3. A fastener as in claim 2, in which there are two such spring members.

4. A fastener as claim 3, in which the outer dimension of the two spring members transversely of the sleeve means axis is slightly greater than the panel opening dimension causing compression of the cross bar outer end portions on the fastener passing through the panel opening.

5. A fastener as in claim 1, in which the wall means, spring means and panel opening have a generally rectangular geometry.

* * * * *